United States Patent
Azami et al.

(10) Patent No.: US 7,206,465 B2
(45) Date of Patent: Apr. 17, 2007

(54) ALL-FIBER LINEAR DESIGN DEPOLARIZER FOR ALL-STATES OF POLARIZATION

(75) Inventors: Nawfel Azami, Rabat (MA); Francois Gonthier, Montreal (CA); Alain Villeneuve, Montreal (CA); Eric Villeneuve, Montreal (CA)

(73) Assignee: ITF Optical Technologies Inc., St-Laurent, Quebec (CA)

( * ) Notice: Subject to any disclaimer, the term of this patent is extended or adjusted under 35 U.S.C. 154(b) by 0 days.

(21) Appl. No.: 10/538,401

(22) PCT Filed: Dec. 9, 2003

(86) PCT No.: PCT/CA03/01916

§ 371 (c)(1),
(2), (4) Date: Nov. 14, 2005

(87) PCT Pub. No.: WO2004/053553

PCT Pub. Date: Jun. 24, 2004

(65) Prior Publication Data

US 2006/0274319 A1    Dec. 7, 2006

(30) Foreign Application Priority Data

Dec. 12, 2002   (CA) ........................... 2414023

(51) Int. Cl.
  *G02B 6/00*   (2006.01)

(52) U.S. Cl. ........................ 385/11; 359/483

(58) Field of Classification Search ............. 385/11; 359/483
See application file for complete search history.

(56) References Cited

U.S. PATENT DOCUMENTS 6,205,262 B1 *  3/2001  Shen ........................... 385/11
6,760,495 B2 *  7/2004  Gonthier et al. ............. 385/11

FOREIGN PATENT DOCUMENTS

| EP | 0 570 151 A | 11/1993 |
| EP | 1 241 499 A | 9/2002 |
| JP | 62 223721 A | 10/1987 |
| JP | 63 113519 A | 5/1988 |

OTHER PUBLICATIONS

Azami et al.; "All-SOP All-Fibre Depolariser"; Electronics Letters, IEE Stevenage, GB, vol. 39, No. 22; Oct. 30, 2003; pp. 1573-1575.
Martinelli M et al.; "Dual Fiber-Ring Depolarizer"; Journal of Lightwave Technology, IEEE; New York, US; vol. 19, No. 6; Jun. 2001; pp. 899-905, no year.

* cited by examiner

*Primary Examiner*—Jennifer Doan
(74) *Attorney, Agent, or Firm*—Robert Brouillette; Brouillette & Partners LLP

(57) ABSTRACT

An all-fiber, all-states of polarization linear design depolarizer is provided. It is made of two polarization combiners (PC1,PC2) with a 2×2 directional coupler (DC) between them. The connections between the coupler (DC) and the two polarization combiners (PC1,PC2) have optical phase delays (L1,L2) and half wave polarization rotators (PR1, PR2,PR3) to make proper adjustments.

12 Claims, 2 Drawing Sheets

ALL-FIBER LINEAR DESIGN DEPOLARIZER FOR ALL-STATES OF POLARIZATION

This application is a National Filing pursuant to 35 U.S.C. 371 based upon International Application No. PCT/CA03/01916, filed Dec. 9, 2003.

FIELD OF THIS INVENTION

This invention relates to an all-fiber depolarizer that can be used to depolarize any state of polarization (SOP) and is therefore suitable for all-SOP depolarization. It also includes a method of making such depolarizer.

BACKGROUND OF THE INVENTION

In a co-pending Canadian patent application No. 2,393,172 which is incorporated herein by reference, there is already disclosed an all-fiber linear design depolarizer which is, however, suitable only for depolarizing a single state of polarization.

There is clearly a need for an all-fiber, all-SOP depolarizer that would allow depolarization of light for any and all SOP.

SUMMARY OF THE INVENTION

The all-SOP, all-fiber depolarizer of the present invention is a combination of two polarization combiners (PC1 and PC2) with a directional coupler positioned in between, such as a 3 dB 2×2 coupler. A polarization rotator means is also used to rotate the polarization; this can be a half wave component producing a polarization maintaining half wave length, such as a half wave plate, a twisted fiber, a fiber configuration using Berry's phase, an axially rotated PM fiber, or similar device. Such rotator device has a birefringence axis making $\pi/4$ rad with the polarization combiner (PC) axis. There must also be provided optical phase delays between each polarization combiner and the coupler.

To describe the mechanism of depolarization one can use the Jones formalism. The input light wave SOP can be generally described by the Jones vector $\vec{E}_{in}$ by reference to the PC axis (x,y) by:

$$\vec{E}_{in} = \begin{bmatrix} \cos\theta \\ \sin\theta \cdot \exp(i\varphi) \end{bmatrix} \cdot f_A(v)$$

where $f_A(v)$ is the amplitude spectral shape of the light source and $\theta$ and $\phi$ are correlated to the azimut $\chi$ and ellipticity $\eta$ of the SOP by the relations:

$$\sin(2\eta) = \sin(2\theta) \cdot \sin(\phi)$$

$$\tan(2\psi) = \tan(2\theta) \cdot \cos(\phi)$$

The outputs of PC1 are such that the SOP in fiber A is Y and SOP in fiber B is X. The Jones vectors $E_A$ and $E_B$ at the outputs A and B are respectively:

$$\vec{E}_A = \begin{bmatrix} 0 \\ \sin\theta \cdot \exp i(\varphi + \gamma_{PC}^Y) \end{bmatrix} \cdot f_A(v)$$

$$\vec{E}_B = \begin{bmatrix} \cos\theta \cdot \exp(i\gamma_{PC}^X) \\ 0 \end{bmatrix} \cdot f_A(v)$$

where $\gamma_{PC}^Y$ and $\gamma_{PC}^X$ are the PC1 induced phases on Y and X polarizations respectively. An optical phase delay (delay1) is induced between the wave propagating in the two branches A and B. A polarization rotator device is used to realize a 90 degrees rotation of the lightwave SOP propagating in fiber B. The Jones vector of the field at the input of the 2×2 directional coupler are:

$$\vec{E}_A = \begin{bmatrix} 0 \\ \sin\theta \cdot \exp i(\varphi + \gamma_{PC}^Y) \end{bmatrix} \cdot f_A(v)$$

$$\vec{E}_B = \begin{bmatrix} 0 \\ \cos\theta \cdot \exp i(\gamma_{PC}^X + \text{delay1}) \end{bmatrix} \cdot f_A(v)$$

The optical delay is induced by using unbalanced fiber lengths between the PC1 outputs and the coupler inputs. However this optical delay can be induced using a difference in the refractive index medium.

Interference will occur at the coupler since the SOP at the inputs of the coupler are parallels. At A and B outputs of the coupler, the Jones vectors are:

$$\vec{E}_A = \begin{bmatrix} 0 \\ \sin\theta \cdot \cos\left(\frac{\Delta\alpha}{2}\right) \cdot \exp i(\varphi + \gamma_{PC}^Y) + i \cdot \cos\theta \cdot \sin\left(\frac{\Delta\alpha}{2}\right) \cdot \exp i(\gamma_{PC}^Y + \text{delay1}) \end{bmatrix} \cdot f_A(v)$$

$$\vec{E}_B = \begin{bmatrix} 0 \\ i \cdot \sin\theta \cdot \sin\left(\frac{\Delta\alpha}{2}\right) \cdot \exp i(\varphi + \gamma_{PC}^Y) + \cos\theta \cdot \cos\left(\frac{\Delta\alpha}{2}\right) \cdot \exp i(\gamma_{PC}^X + \text{delay1}) \end{bmatrix} \cdot f_A(v)$$

where $\Delta\alpha$ is the phase difference between the symmetric and anti-symmetric super modes of the coupler. A second phase delay (delay2) is induced between $\vec{E}_A$ and $\vec{E}_B$. A 90 degrees rotator device is used such that the SOP of the wavelength propagating in A and B fibers are orthogonal and aligned with the eigen axis of PC2. Hence, the electric field at the output of PC2 can be written in terms of Jones vector as:

$$\vec{E}_{out} = \begin{bmatrix} \left(i \cdot \sin\theta \cdot \sin\left(\frac{\Delta\alpha}{2}\right) \cdot \exp i(\varphi + 2\gamma_{PC}^Y) + \cos\theta \cdot \cos\left(\frac{\Delta\alpha}{2}\right) \cdot \exp i(2\gamma_{PC}^X + \text{delay1})\right) \cdot \exp i(\text{delay2}) \\ \sin\theta \cdot \cos\left(\frac{\Delta\alpha}{2}\right) \cdot \exp i(\varphi + 2\gamma_{PC}^Y) + i \cdot \cos\theta \cdot \sin\left(\frac{\Delta\alpha}{2}\right) \cdot \exp i(2\gamma_{PC}^X + \text{delay1}) \end{bmatrix} \cdot f_A(v)$$

where $I_X(v)$ and $I_Y(v)$ intensities corresponding to the X and Y polarisation states at frequency v are:

$$\begin{bmatrix} I_X(v) \\ I_Y(v) \end{bmatrix} = f_A^2(v) \begin{bmatrix} \sin^2\theta \cdot \sin^2\left(\frac{\Delta\alpha}{2}\right) + \cos^2\theta \cdot \cos^2\left(\frac{\Delta\alpha}{2}\right) - \frac{1}{2} \cdot \sin 2\theta \cdot \sin\Delta\alpha \cdot \sin(2\gamma_{PC}^Y + \varphi - 2\gamma_{PC}^X - \text{delay1}) \\ \sin^2\theta \cdot \cos^2\left(\frac{\Delta\alpha}{2}\right) + \cos^2\theta \cdot \sin^2\left(\frac{\Delta\alpha}{2}\right) + \frac{1}{2} \cdot \sin 2\theta \cdot \sin\Delta\alpha \cdot \sin(2\gamma_{PC}^Y + \varphi - 2\gamma_{PC}^X - \text{delay1}) \end{bmatrix}$$

The light source has a power spectral density S(v):

$$S(v) = f_A^2(v)$$

The total average intensity is normalized to unity:

$$I = \int_0^\infty S(v) dv = 1$$

The coherence length of the light source is:

$$L_c = c \int_0^\infty S(v)^2 dv$$

The autocorrelation function G(L) is defined as:

$$G(L) = \int_{-\infty}^{+\infty} S(v) \cdot \exp\left(i 2\pi v \cdot \frac{L}{c}\right) dv$$

Because of the Fourier-transform relation between S(v) and G(L), their widths are inversely related. One can show that if L is greater than the coherence length, G(L) tend to be zero.

The theory of partial polarization is based on characterizing the components of the optical field vector $\vec{E}_{out}$ (eq.) by correlations and cross correlations. These components describe the coherency matrix G:

$$G = \begin{bmatrix} G_{XX} & G_{XY} \\ G_{YX} & G_{YY} \end{bmatrix}$$

where the diagonal elements are the average intensities Ix and Iy given by eq. ( ). The off-diagonal elements are the cross-correlations.

$$\begin{bmatrix} G_{XX} & G_{XY} \\ G_{YX} & G_{YY} \end{bmatrix} = \begin{bmatrix} I_X & \langle E_{out}^X \cdot \vec{E}_{out}^Y \rangle \\ \langle E_{out}^Y \cdot \vec{E}_{out}^X \rangle & I_Y \end{bmatrix}$$

The degree of polarization is given by:

$$DOP = \left\{ 1 - 4 \cdot \left[\frac{I_X \cdot I_Y}{(I_X + I_Y)^2}\right] \cdot \left(1 - \frac{|G_{XY}|^2}{I_X \cdot I_Y}\right) \right\}^{1/2}$$

The following two conditions can thus be presented.

Condition 1: Equal average intensities for X and Y polarizations for any SOP.

To increase the polarization scrambling at the output of the depolariser, the condition on equal average intensities Ix and Iy has to be satisfied.

If the optical delay induced by delay1 is much greater than the coherence length of the source, then the average intensities for X and Y polarizations are given by:

$$\begin{bmatrix} I_X \\ I_Y \end{bmatrix} = \begin{bmatrix} \sin^2\theta \cdot \sin^2\left(\frac{\Delta\alpha}{2}\right) + \cos^2\theta \cdot \cos^2\left(\frac{\Delta\alpha}{2}\right) \\ \sin^2\theta \cdot \cos^2\left(\frac{\Delta\alpha}{2}\right) + \cos^2\theta \cdot \sin^2\left(\frac{\Delta\alpha}{2}\right) \end{bmatrix}$$

The condition of equal intensities Ix and Iy is satisfied for any SOP for a coupler difference phase $\Delta\alpha$ of $\pi/2$, which indicate that a 3 dB transmission coupler is the more appropriate coupler. In this case:

$$I_X = I_Y = \frac{1}{2}$$

for any $(\theta, \phi)$, i.e. for any SOP

Condition 2: Uncorrelated X and Y polarizations

The two orthogonal components X and Y are completely uncorrelated when the cross-correlations $G_{XY}$ and $G_{YX}$ are equal to zero.

Denoting:

$$\text{delay1} = \frac{2 \cdot \pi \cdot v}{c} \cdot \Delta L1 \quad \text{delay2} = \frac{2 \cdot \pi \cdot v}{c} \cdot \Delta L2$$

One can write the cross-correlations as:

$$G_{XY}(\Delta L1, \Delta L2) = \left[ \frac{i}{2} \cdot \cos 2\theta \cdot \int_\infty S(v) \cdot \exp\left(i \frac{2\pi}{c} \cdot v \cdot \Delta L1\right) dv + \right.$$
$$\frac{1}{4} \cdot \sin 2\theta \cdot \int_\infty S(v) \cdot \exp\left(i \frac{2\pi}{c} \cdot v \cdot (\Delta L1 + \Delta L2 + 2\Delta \gamma_{PC} - \varphi)\right) dv +$$
$$\left. \frac{1}{4} \cdot \sin 2\theta \cdot \int_\infty S(v) \cdot \exp\left(i \frac{2\pi}{c} \cdot v \cdot (\Delta L2 - \Delta L1 - 2\Delta \gamma_{PC} + \varphi)\right) dv \right]$$

Hence $G_{XY}=0$ for any SOP if $$\begin{vmatrix} \Delta L1 \gg L_c \\ \Delta L2 \gg L_c \\ |\Delta L1 - \Delta L2| \gg L_c \end{vmatrix}$$

An advantage of this linear-design all SOP-depolariser is its easy way of integration. First of all, the 3 dB coupler and PC2 are assembled using power measurement with a given linear SOP at the input. The rotator device is adjusted such that a maximal power is detected at the output of the PC2. At this level, the device is a depolariser working for a linear SOP at the input of the 3 dB coupler. To allow an all SOP depolarizer PC1 is then added. Polarization rotator devices are used in the branches between PC1 and the coupler to make the polarizations parallel and aligned with one eigen axis of PC1. This is made by optimizing the power detected at the output of PC2 using a given SOP at the input of PC1. One can then verify a low and constant DOP for any SOP at the assembly input.

Therefore, surprisingly, it was found that an all-fiber, all-SOP linear design depolarizer can be produced by providing an additional polarization combiner and connecting it in a controllable manner to the input side of the coupler of the all-fiber linear design depolarizer that is disclosed and claimed in applicant's Canadian patent application No. 2,393,172.

Thus, the all-fiber, all-states of a polarization, linear design depolarizer of the present invention for depolarizing a light source comprises:

(a) a first polarization combiner with two inputs and two outputs;

(b) a directional coupler connected to said first polarization combiner by two branches extending from the outputs of the first polarization combiner, one of the branches between the coupler and the first polarization combiner having means adapted to produce an optical phase delay greater than the coherence length of the light source, and each of the two branches having a polarization rotator means adapted to make the polarization in the two branches parallel and aligned with one eigen axis of the first polarization combiner; and (c) a second polarization combiner following the coupler and connected by two branches to said coupler, one of the branches between the coupler and the second polarization combiner having means adapted to produce an optical phase delay greater than the coherence length of the light source, and also having a polarization rotation means adapted to maintain a half wave length.

The method of manufacturing the novel all-fiber, all-SOP depolarizer, comprises:

(a) connecting a directional coupler and a polarization combiner by two branches, using power measurement with a given linear state of polarization at the input of the coupler;

(b) providing in one of the branches between the coupler and the polarization combiner an optical phase delay greater than the coherence length of the light source to be depolarized and a polarization rotator means and adjusting said polarization rotator means so that maximal power is detected at the output of the polarization combiner; and (c) connecting by two branches another polarization combiner at the opposite side of the coupler and providing in one of the branches between said polarization combiner and the coupler an optical phase delay greater than the coherence length of the light source, and a polarization rotator means in each branch to make the polarization in the two branches parallel and aligned with one eigen axis of the polarization combiner.

In the above described all-fiber linear design depolarizer for all-states of polarization and method of producing same the fibers used are standard single mode (SM) fibers. However, it would also be possible to use birefringent or polarization maintaining (PM) fibers, in which case the polarization rotator means would simply be achieved by a 90° axial rotation of the PM fiber in the places where the polarization rotator means or devices are provided. This can readily be achieved, for example, by fusion splicing the PM fibers at a 90° angle to obtain the desired half wave polarization. It should be noted, however, that PM fibers are more expensive than SM fibers and consequently it may or may not be appropriate to use them depending on specific circumstances.

DETAILED DESCRIPTION OF THE INVENTION

A preferred, but non-limitative embodiment of the invention will now be described with reference to the drawings in which the same elements are identified with the same reference numbers.

Figure 1:
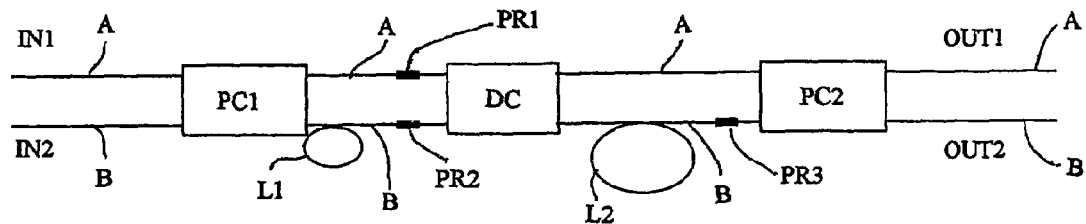
FIG. 1 is a schematic representation of the basic design of the depolarizer of the present invention.

FIG. 1, illustrates a schematic arrangement of the all-fiber, all-SOP linear design depolarizer of the present invention. In this figure, IN1 and IN2 represent two inputs through fibers A and B respectively into a first polarization combiner PC1. Such polarization combiner may, for instance, be a Mach-Zehnder interferometer. Following the polarization combiner PC1, the fibers A and B connect to a directional coupler DC, such as a 3 dB 2×2 coupler. Branch A between PCI and CD has an axis alignment device PR1, such as a λ/2 rotator device which, for example, may be a half wave plate or a twisted fiber producing π/2 rotation. Branch B between PC1 and DC has a loop L1 producing an optical delay in this branch greater than the coherence length of the light source of the light pumped, for instance, into IN1. Other means for producing such optical delay can also be used. Moreover, Branch B between PC1 and DC also has a polarization rotation half wave λ/2 device PR2. The two polarization rotation devices PR1 and PR2 are set to make the polarization parallel in the two branches A and B between PC1 and DC and aligned with one eigen axis of PC1.

After exiting from the directional coupler DC, fibers A and B extend and connect with a second polarization combiner PC2. Between DC and PC2, branch B is again provided with a loop L2 producing an optical delay in this branch greater than the coherence length of the light source, and is also provided with a polarization rotator PR3 adapted to maintain a half wave length. Depolarized light then exits by output OUT1 through fiber A from PC2 and losses exit by output OUT2 through fiber B.

Figure 2:
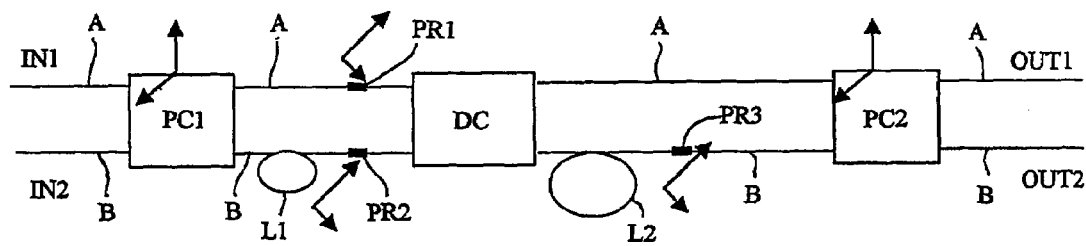
FIG. 2 is a schematic representation similar to that of FIG. 1, but indicating the birefringence axis configuration.

FIG. 2 shows the birefringence axis configuration with the arrangement of FIG. 1. This is shown by the arrows at different locations in FIG. 2. Thus, the arrows at PC1 show the birefringence axis configuration after the polarized light is pumped into PC1 from IN1. As the light then passes through branches A and B between PC1 and DC, its birefringence axis is maintained parallel by PR1 and PR2. The same birefringence axis configuration is maintained in branch B between DC and PC2 by polarization rotator PR3 as shown by the arrows at PR3. And at PC2 the light is depolarized as shown by the arrows at PC2.

Figure 3:
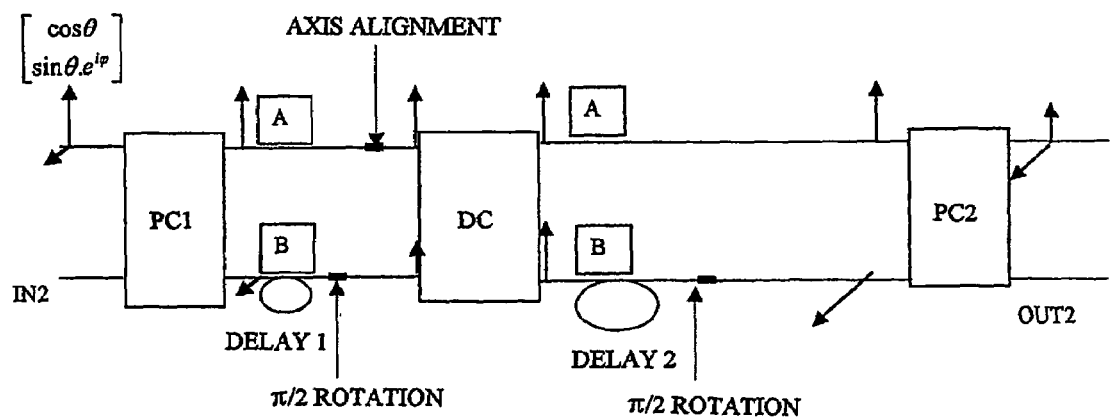
FIG. 3 is a schematic representation similar to that of FIG. 1 and FIG. 2, but further showing the SOP propagation.

FIG. 3 is similar to FIG. 1 and FIG. 2 but illustrates by the various arrows shown therein the state of polarization propagation within the depolarizer arrangement. Due to the phase DELAY1 in this arrangement, the DC coupler outputs A and B have equal average power and due to the phase DELAY2, the polarizations at the output of PC2 are decorrelated.

Figure 4:
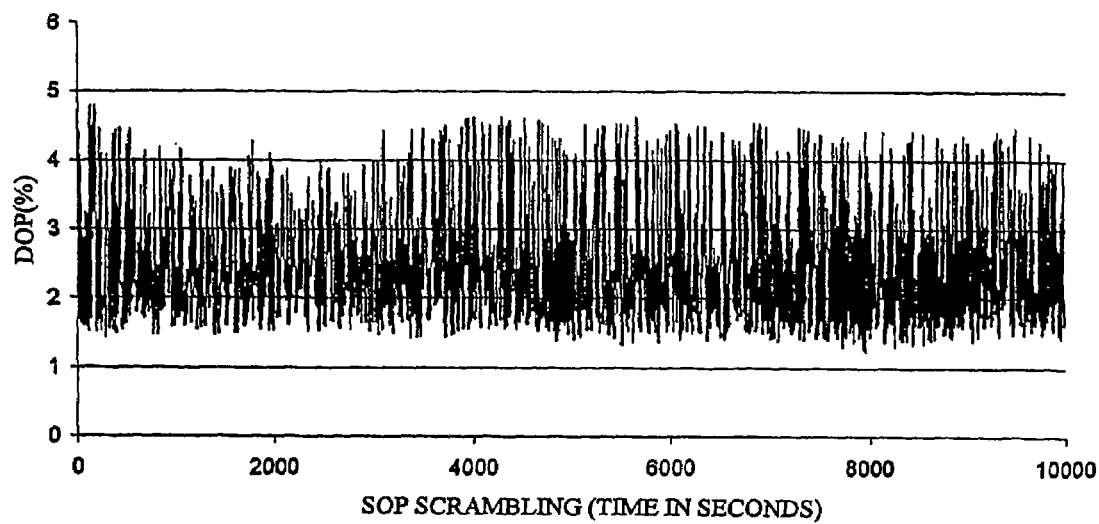
FIG. 4 is a graph showing the DOP as a function of time with SOP scrambling.

FIG. 4 shows the actual result of a DOP vs SOP at 1490 nm achieved by the depolarizer of the present invention. It shows an excellent and stable DOP over the SOP scrambling time.

Figure 5:
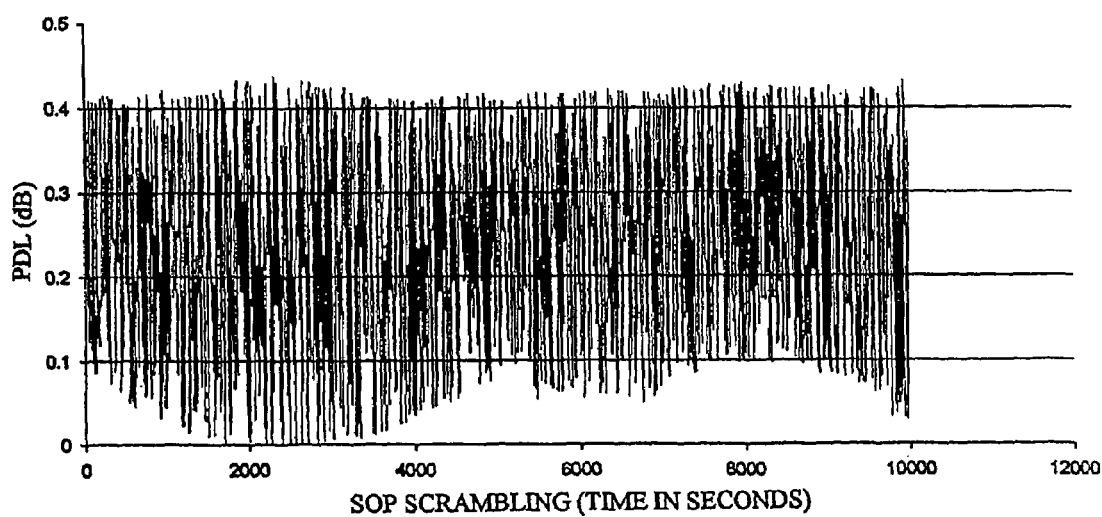
FIG. 5 is a graph showing the PDL of the novel linear design as a function of time with SOP scrambling.

Finally, FIG. 5 shows the actual result of the polarization dependent loss (PDL) as a function of SOP scrambling time in the depolarizer of the present invention. It shows that the low loss is conserved over a wide band spectral range.

It should be noted that the all-fiber, all-SOP linear design depolarizer of the present invention is more achromatic than known fiber ring all-SOP designs, since it requires no polarization controller, other than using half wave PM length (0 order for the length).

The depolarizer of the present invention is very stable. The one passage light propagation in symmetrical branches makes it more stable than any other known design, especially when comparing it to the dual fiber ring couplers where the configuration of the polarization controllers must be correlated.

The invention is defined in the following claims which, however, are not limited by the specific embodiments described and illustrated herein, but include various modifications obvious to those skilled in the art.

The invention claimed is:

1. An all-fiber, all-states of polarization, linear design depolarizer for depolarizing a light source, which comprises:
    a) a first polarization combiner with two inputs and two outputs;
    b) a directional coupler connected to said first polarization combiner by two branches extending from the outputs of the first polarization combiner, one of the branches between the coupler and the first polarization combiner having means adapted to produce an optical phase delay greater than the coherence length of the light source, and each of the two branches having a polarization rotator means adapted to make the polarization in the two branches parallel and aligned with one eigen axis of the first polarization combiner; and
    c) a second polarization combiner following the coupler and connected by two branches to said coupler, one of the branches between the coupler and the second polarization combiner having means adapted to produce an optical phase delay greater than the coherence length of the light source, and also having a polarization rotator means adapted to maintains a half wave length.

2. An all-fiber, all-states of polarization, linear design depolarizer according to claim 1, in which the first polarization combiner is a Mach-Zehnder interferometer.

3. An all-fiber, all-states of polarization linear design depolarizer according to claim 1, in which the directional coupler is a 3 dB 2×2 coupler.

4. An all-fiber, all-states of polarization linear design depolarizer according to claim 1, in which the means adapted to produce an optical phase delay in one of the branches between the first polarization combiner and the coupler consists of a fiber loop.

5. An all-fiber, all-states of polarization linear design depolarizer according to claim 1, in which the means adapted to produce an optical phase delay in one of the branches between the first polarization combiner and the coupler are such as to produce equal average power in the coupler outputs.

6. An all-fiber, all-states polarization linear design depolarizer according to claim 1, in which the means adapted to produce an optical phase delay between the coupler and the second polarization combiner are such as to decorrelate the polarizations at the output of the second polarization combiner.

7. An all-fiber, all-states of polarization linear design depolarizer according to claim 1, in which the polarization rotator means are such as to produce p/2 rotation.

8. An all fiber, all states polarization linear design depolarizer according to claim 1, in which the rotator means between the coupler and the second polarization combiner is adjusted so as to maximize power at the output of the second polarization combiner.

9. An all fiber, all states polarization linear design depolarizer according to claim 1, which is made of PM fibers and in which the polarization rotator means consist of a 90° axial rotation of the PM fibers.

10. Method of producing an all-fiber, all-states of polarization, linear design depolarizer, which comprises:
    a) connecting a directional coupler and a polarization combiner by two branches, using power measurement with a given linear state of polarization at the input of the coupler;
    b) providing in one of the branches between the coupler and the polarization combiner an optical phase delay greater than the coherence length of the light source to be depolarized and a polarization rotator means and adjusting said polarization rotator means so that maximal power is detected at the output of the polarization combiner; and c) connecting by two branches another polarization combiner at the opposite side of the coupler and providing in one of the branches between said polarization combiner and the coupler an optical phase delay greater than the coherence length of the light source, and also providing a polarization rotator means in each branch to make the polarization in the two branches parallel and aligned with one eigen axis of the polarization combiner.

11. Method according to claim 10, in which PM fibers are used for producing the all-fiber, all-states of polarization linear design depolarizer, in which case the rotator means consist of a 90° axial rotation of said PM fibers.

12. Method according to claim 11, in which the 90° axial rotation is achieved by fusion splicing the PM fibers at a 90° angle.

* * * * *